US008634034B2

(12) United States Patent
Roh et al.

(10) Patent No.: US 8,634,034 B2
(45) Date of Patent: Jan. 21, 2014

(54) STEREOSCOPIC IMAGE DISPLAY AND ALIGNMENT METHOD THEREOF

(75) Inventors: Sudong Roh, Gunpo-si (KR); Hoon Kang, Namyangju-si (KR); Jaewuk Jeong, Daegu (KR)

(73) Assignee: LG Display Co., Ltd., Seoul (KR)

( * ) Notice: Subject to any disclaimer, the term of this patent is extended or adjusted under 35 U.S.C. 154(b) by 540 days.

(21) Appl. No.: 12/949,133

(22) Filed: Nov. 18, 2010

(65) Prior Publication Data

US 2011/0255018 A1 Oct. 20, 2011

(30) Foreign Application Priority Data

Apr. 16, 2010 (KR) .................... 10-2010-0035184

(51) Int. Cl.
*G02F 1/1335* (2006.01)
*G02B 27/26* (2006.01)
*H04N 13/04* (2006.01)

(52) U.S. Cl.
USPC .............................. 349/15; 359/465; 356/401

(58) Field of Classification Search
USPC .......... 349/15, 117; 359/465, 489.07; 348/58; 356/399, 401, 620
See application file for complete search history.

(56) References Cited

U.S. PATENT DOCUMENTS

| 2004/0012851 | A1 | 1/2004 | Sato et al. |
| 2009/0310216 | A1* | 12/2009 | Roh et al. ...................... 359/465 |
| 2010/0053617 | A1 | 3/2010 | Mori |
| 2011/0025833 | A1* | 2/2011 | Baik et al. ...................... 348/58 |

FOREIGN PATENT DOCUMENTS

| JP | 2003075773 A | 3/2003 |
| JP | 2005-266438 | 9/2005 |
| JP | 2010055043 A | 3/2010 |
| KR | 20090006457 A | 1/2009 |

OTHER PUBLICATIONS

Office Action issued in corresponding United Kingdom Patent Application No. 1020470.9, mailed Mar. 15, 2011.
Office Action issued in corresponding United Kingdom Patent Application No. GB1020470.9, mailed Aug. 1, 2012.
Office Action issued in corresponding United Kingdom Patent Application No. GB1206565.2, mailed Aug. 1, 2012.

* cited by examiner

*Primary Examiner* — Dong Nguyen
*Assistant Examiner* — Tai Duong
(74) *Attorney, Agent, or Firm* — Brinks Gilson & Lione (57) ABSTRACT

A stereoscopic image display device includes a display panel; a plurality of display alignment marks disposed along a first edge and a second edge of the display panel, respectively, the first edge being opposite to the second edge, wherein two of the plurality of display alignment marks are disposed at a midpoint along opposite side edges of the display panel; a 3D filter disposed in planar relation to the display panel; and a plurality of filter alignment indicia portions disposed on the 3D filter.

13 Claims, 14 Drawing Sheets

FIG. 1

(RELATED ART)

STEREOSCOPIC IMAGE DISPLAY AND ALIGNMENT METHOD THEREOF

This application claims the benefit of Korea Patent Application No. 10-2010-0035184 filed on Apr. 16, 2010, the entire contents of which are incorporated herein by reference as if fully set forth herein.

BACKGROUND

1. Field of the Invention

This document relates to a stereoscopic image display and an alignment method thereof.

2. Discussion of the Related Art

An image display device implements 3D images using a stereoscopic technique and an autostereoscopic technique.

The stereoscopic technique uses binocular parallax images which produce large stereoscopic effects, and may or may not have a corresponding set of lenses or eyeglasses for viewing by the user. In the type of system using eyeglasses, binocular parallax images are displayed on a direct view display panel or by a projector by changing polarization directions. Alternatively, using temporal division, polarization eyeglasses or liquid crystal shutter eyeglasses may be used to implement stereoscopic images. In the type of system not using eyeglasses, the stereoscopic images are implemented by dividing optical axes of binocular parallax images, where optical plates, such as parallax barriers, are provided at front and rear surfaces of a display panel.

To mass-produce the stereoscopic image display devices, it is necessary to efficiently align a display device and a 3D filter, which is disposed on the display device and divides light from the display device into light corresponding to left eye images and light corresponding to right eye images.

Figure 1:
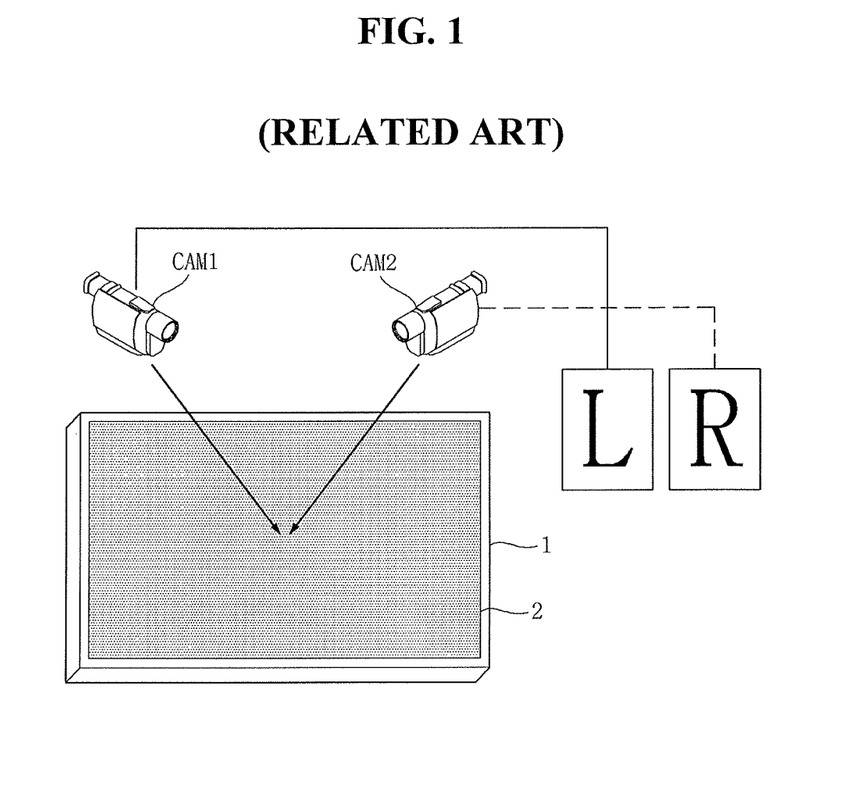
FIG. 1 is a diagram illustrating a method of aligning a parallax barrier in a related art stereoscopic image display device.

A method of aligning a parallax barrier with a display panel has been proposed in Korean Patent No. 10-0709728, where separate eyeglasses are not used. In this method, as shown in FIG. 1, two cameras CAM1 and CAM2 disposed at a predetermined distance from the display panel 1 and from the parallax barrier 2, take stereoscopic images displayed on the display panel 1. The display panel 1 and the parallax barrier 2 are repeatedly realigned while checking the division state of left eye images and right eye images until reaching a predetermined alignment reference state.

However, in a method of aligning a display panel with a 3D filter by a worker who views images displayed on the display panel based on luminosity, or in a method that determines whether or not stereoscopic images are divided over a predetermined reference value in a system using two cameras, power data and test pattern data must be provided to the display panel so as to display the images. Therefore, using such related art alignment techniques, it is difficult to numerically quantify the degree of alignment or misalignment, equipment cost is high, and productivity is low.

In a known method of aligning a display panel with a 3D filter in the eyeglass type stereoscopic image display device, a worker wears polarization eyeglasses, drives a display panel placed at a certain distance, determines an alignment degree between the display panel and the 3D filter through luminosity, and repeats the above-described operation until images displayed on the display panel are properly viewed. The assignee of the present application has proposed, in Korean Patent No. 10-0939214, a alignment system and method of stereoscopic image display devices which can automatically align the 3D filter with the display panel in the eyeglass type and solve the problems disclosed in Korean Patent No. 10-0709728. In this method, alignment marks are formed in a display panel and a 3D filter, the alignment marks are checked by a vision system, and thereby the display panel and the 3D filter can be aligned with each other without driving the display panel. Also, an alignment state can be quantified by checking an alignment state of the alignment marks.

The 3D filter may have a known tolerance or variation. In this case, because an accumulated error increases as the distance increase from the alignment reference positions (alignment marks) during the alignment of the display panel with the 3D filter, an alignment error accumulates. As a result, up and down viewing angles in the stereoscopic image display device may be narrowed due to the tolerance or variation of the 3D filter.

BRIEF SUMMARY

Embodiments of this document provide a stereoscopic image display device and an alignment method thereof capable of minimizing a phenomenon in which up and down viewing angles are narrowed. According to an exemplary embodiment, a stereoscopic image display device includes a display panel; a plurality of display alignment marks disposed along a first edge and a second edge of the display panel, respectively, the first edge being opposite to the second edge, wherein two of the plurality of display alignment marks are disposed at a midpoint along opposite side edges of the display panel; a 3D filter disposed in planar relation to the display panel; and a plurality of filter alignment indicia portions disposed on the 3D filter.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE DRAWINGS AND THE PRESENTLY PREFERRED EMBODIMENTS

Hereinafter, embodiments of the invention will be described in detail with reference to the accompanying drawings. Like reference numerals designate like elements throughout the specification. In the following description, when a detailed description of well-known functions or configurations is determined to be unnecessary the understanding of the invention, such description will be omitted.

In the following embodiments, alignment indicia portions are defined as reference position marking points for aligning a display panel and a 3D filter, and are formed in plurality in each of the display panel and the 3D filter. The alignment indicia portions may be implemented by alignment marks and/or dummy retarder patterns like the following embodiments.

Figure 2:
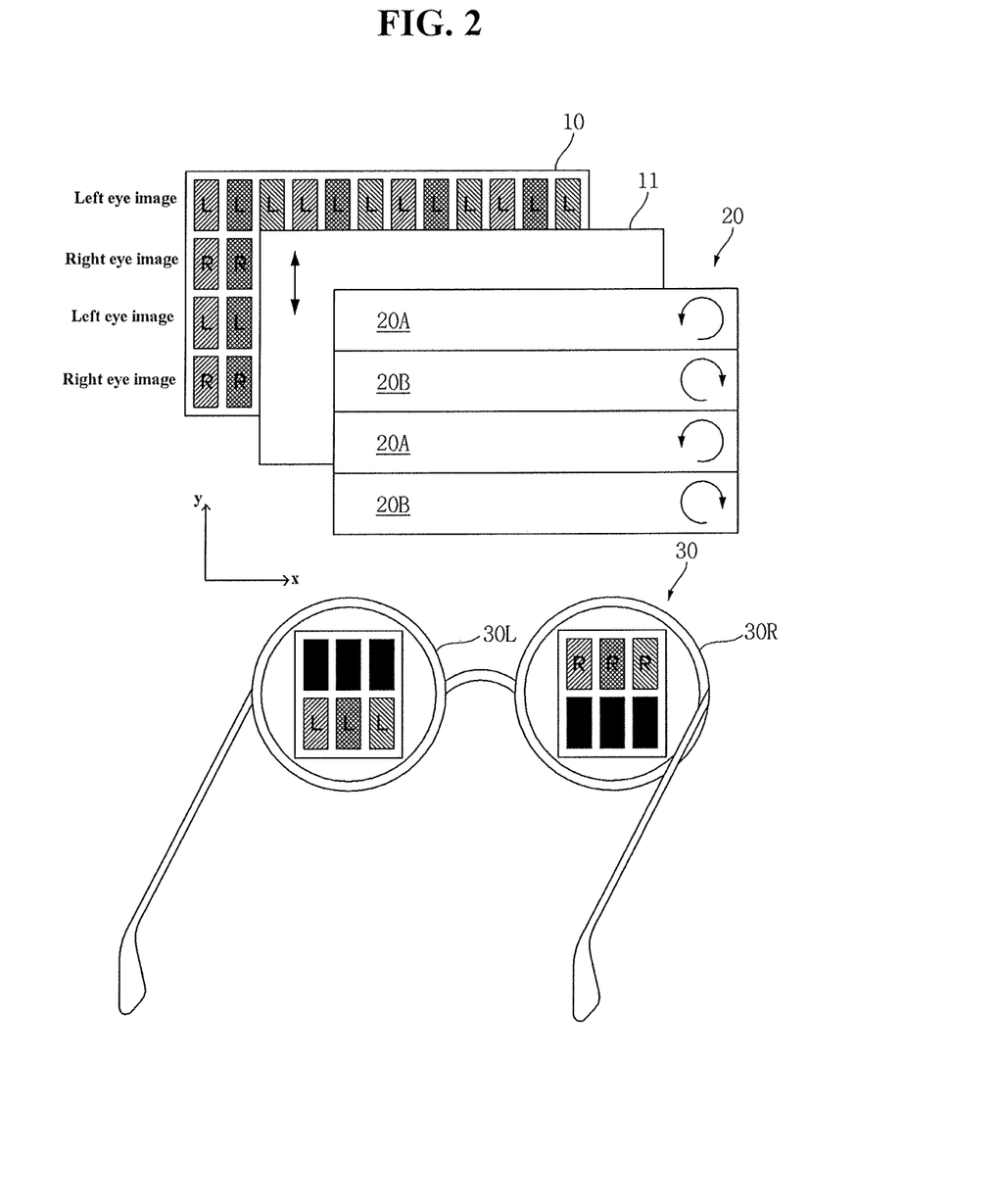
FIG. 2 is a diagram illustrating a stereoscopic image display device according to an embodiment of the invention.

Referring to FIG. 2, a stereoscopic image display device according to an embodiment of this document comprises a display 10, a 3D filter 20, and polarization glasses 30.

The display panel 10 may be implemented by display panels of flat display devices such as a liquid crystal display (LCD), a field emission display (FED), a plasma display panel (PDP), an electroluminescence device (EL), an electrophoresis display (EPD), and so on. Hereinafter, the display panel 10 will be described by exemplifying a display panel of the liquid crystal display.

The display panel 10 comprises a lower transparent substrate provided with a thin film transistor (TFT) array, an upper transparent substrate provided with a color filter array, and a liquid crystal layer interposed between the substrates. In the lower transparent substrate, a polarization film is attached to the rear surface facing a backlight unit, and an alignment layer for setting a pretilt angle of the liquid crystal is formed at a surface contacting with the liquid crystal layer. In the upper transparent substrate, a polarization film 11 is attached to the front surface facing the 3D filter 20, and an alignment layer is formed at a surface contacting with the liquid crystal layer.

The lower transparent substrate is provided with data lines supplied with data voltages, gate lines (or scan lines) which intersect the data lines and are sequentially supplied with gate pulses (scan pulses) synchronized with the data voltages, TFTs formed at the intersections of the data lines and the gate lines, and pixel electrodes respectively connected to the TFTs. The data lines are arranged in the longitudinal direction (y axis direction) of the display panel 10 and the gate lines are arranged in the transverse direction (x axis direction) of the display panel 10. The liquid crystal layer is driven by electric fields generated by the pixel electrodes applied with the data voltages and common electrodes applied with common voltages. The common electrodes are disposed on the upper transparent substrate in a vertical electric field driving type such as a TN (twisted nematic) mode and a VA (vertical alignment) mode, and are disposed on the lower transparent substrate along with the pixel electrodes in a horizontal electric field type such as an IPS (in plane switching) mode and an FFS (fringe field switching) mode.

The display panel 10 displays data for 2D input images in a 2D mode where data is not separated according to left and right viewing. Rather, in such a 2D mode, each pixel displayed corresponds to the image exactly. The display panel 10 also displays left eye image data L and right eye image data R for 3D input images in the form of a line by line presentation in a 3D mode. For example, as shown in FIG. 2, the left eye image data L may be displayed in odd numbered lines of the display panel 10, and the right eye image data R may be displayed in even numbered lines of the display panel 10. The polarization film 11 is attached between the upper transparent substrate of the display panel 10 and the 3D filter 20. The polarization film 11 transmits only a linearly polarized light, which is transmitted through the liquid crystal layer and incident on the polarization film 11.

The 3D filter 20 is attached onto the polarization film 11 of the display panel 10. The 3D filter 20 shown in FIG. 2 exemplifies a retarder, which delays a phase of light by $\lambda/4$ using a birefringence medium. The 3D filter 20 includes first retarder patterns 20A corresponding to the odd numbered lines of the display panel 10 and second retarder patterns 20B corresponding to the even numbered lines of the display panel 10. Light absorption axes of the first retarder pattern 20A and the second retarder pattern 20B are perpendicular to each other. The first retarder pattern 20A, which is aligned with and faces the odd numbered line, converts a light from the odd numbered line into a light undergoing left-circular polarization (or right-circular polarization). The second retarder pattern 20B, which is aligned with and faces the even numbered line, converts a light from the even numbered line into a light undergoing right-circular polarization (or left-circular polarization).

A left lens of the polarization eyeglasses 30 includes a polarization filter, which passes only a light having undergone left-circular polarization (or right-circular polarization) therethrough, and a right lens of the polarization eyeglasses 30 includes a polarization filter which passes only a light having undergone right-circular polarization (or left-circular polarization) therethrough. A viewer wearing the polarization eyeglasses 30 views only left eye images with the left eye and only right eye images with the right eye to sense images displayed on the display panel 10 as stereoscopic images. The viewer may view 2D images in the 2D mode without wearing the eyeglasses.

In order to align the display panel 10 with the 3D filter 20, two or more alignment marks are formed in the display panel 10. Also, alignment marks are formed in the 3D filter so as to correspond to the alignment marks in the display panel 10.

Figure 3:
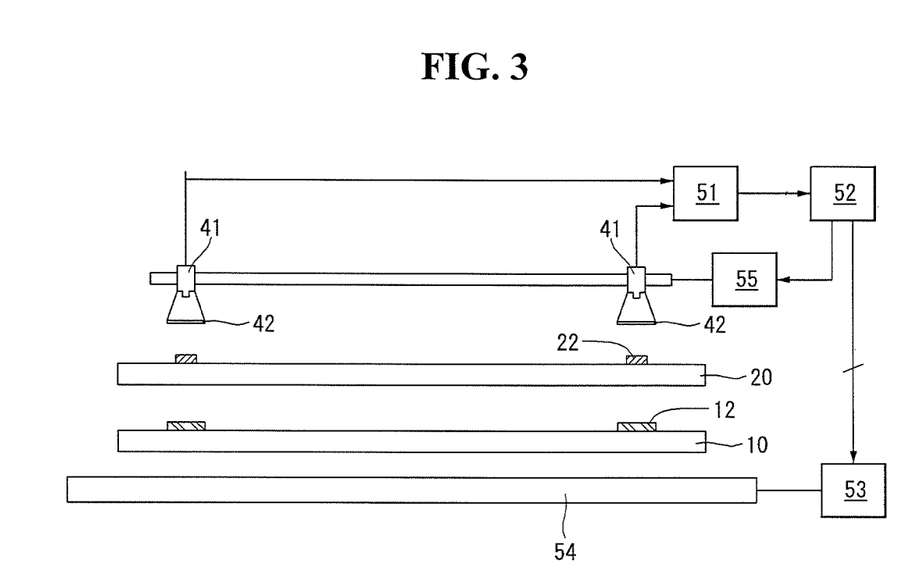
FIG. 3 is a diagram illustrating an alignment system of the stereoscopic image display device according to the embodiment of the invention.

FIG. 3 shows an alignment system of the stereoscopic image display device according to the embodiment of this document.

In FIG. 3, the alignment system comprises a vision system, an image analysis unit 51, a controller 52, an alignment driver 53, and an xyθ table 54.

The display panel 10 provided with alignment marks 12 is placed on the xyθ table 54. The 3D filter 20 provided with alignment marks 22 is aligned on the display panel 10 in planar relation.

The vision system comprises two or more cameras 41 facing the alignment marks 22 in the display panel side, polarization filters 42 disposed between camera lenses and the 3D filter, and a camera transfer driver 55 which transfers the cameras 41 in an x-axis direction and in a y-axis direction, as shown in FIG. 3. The polarization filters 42 transmit specific polarization light towards the cameras 42. The polarization filters 42 may be omitted. The camera transfer driver 55 drives a two-axial robot or a two-axial guide equipped with the cameras 41 and moves the cameras 41 in the x-axis direction or in the y-axis direction under the control of the controller 52.

The image analysis unit 51 or controller performs analog-digital conversion for data output from the cameras 41, and performs imaging processing for the digital data so as to clearly show images for the alignment marks. The controller 52 calculates an error between a reference point and a center point of each alignment mark obtained by the cameras 41 (axial misalignment). The controller 52 calculates an error between center points of the alignment marks 12 formed in the display panel 10 and center points of the alignment marks 22 formed in the 3D filter and facing them. The alignment driver 53 moves the X-Y table 54 where the display panel 10 is placed such that the error values from the controller 52 become "0." The alignment driver 53 may be separate from the controller 52 or may be combined into a signal component. Note that the X-Y table may support and move either the display panel 10 or the 3D filter 20, or both. It is immaterial to the scope of this invention which component is moved as long as the alignment error is minimized when the display panel 10 and the 3D filter 20 are moved relative to each other.

The xyθ table 54 supports the display panel 10 under the display panel 10. The xyθ table 54 moves the substrate of the display panel 10 in the x-axis and y-axis directions by the alignment driver 53 and rotates the display panel in the θ direction.

An alignment of the display panel 10 with the 3D filter 20 described below may be performed in a state where the display panel 10 is not driven.

Figure 4:
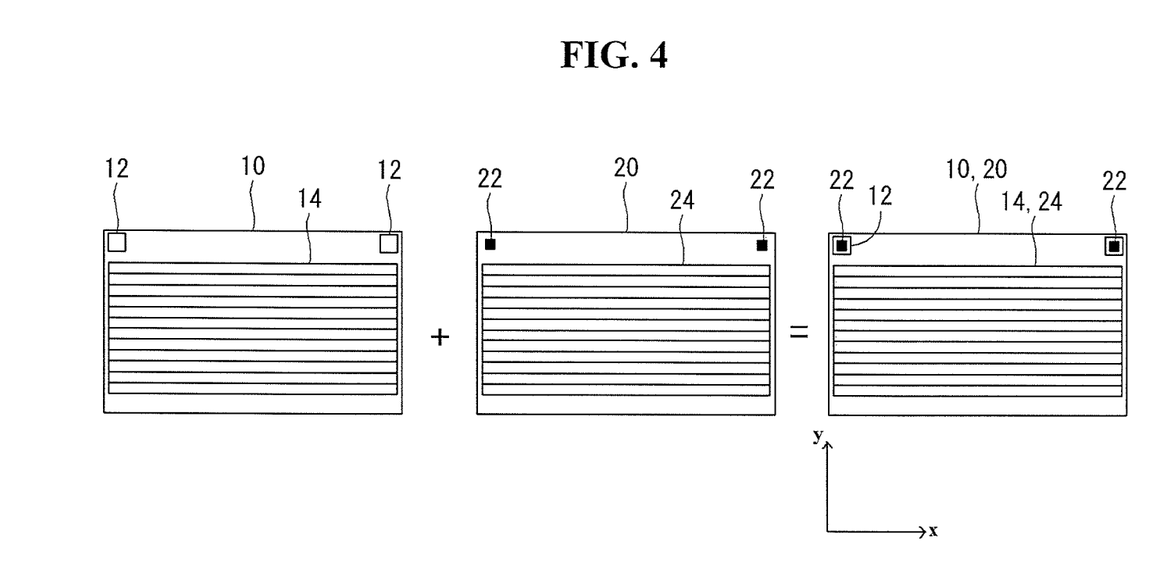
FIG. 4 is a diagram illustrating an ideal alignment state of a display panel with a 3D filter when alignment marks are formed at one side edges of the display panel and the 3D filter.
Figure 5:
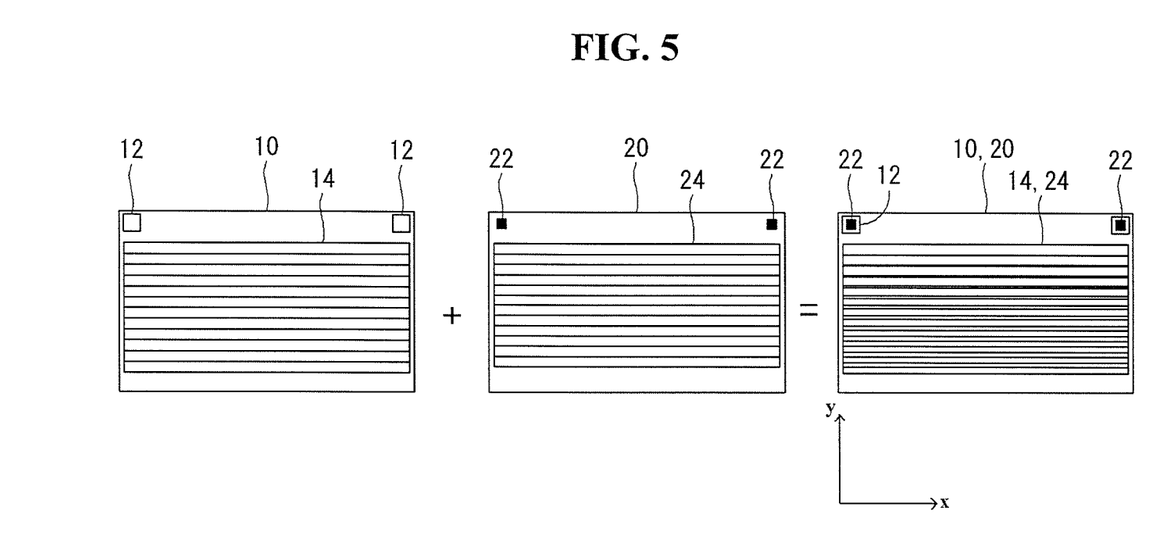
FIG. 5 is a diagram illustrating a poor alignment of the display panel with the 3D filter due to tolerance of the 3D filter when the alignment marks are formed at one side edges of the display panel and the 3D filter.

FIG. 4 is a diagram illustrating an ideal alignment state of the display panel 10 with the 3D filter 20 when the alignment marks 12 and 22 are formed at one side edge of the display panel and the 3D filter. FIG. 5 is a diagram illustrating poor alignment of the display panel with the 3D filter caused by tolerance of the 3D filter when the alignment marks are formed at only one side edge of the display panel and the 3D filter.

If the 3D filter 20 is aligned with the display panel 10 with respect to the alignment marks 12 and 22 formed at the upper ends of the 3D filter having no tolerance, as shown in FIG. 4, all the lines of the display panel 10 and the 3D filter 30 can be aligned with each other in accordance with a design value without an alignment error. However, generation of errors in the 3D filter 20 is unavoidable in the manufacturing process thereof. In FIGS. 4 and 5, the reference numeral 14 denotes an active region which displays 2D images and 3D images in the display panel 10. The active region of the display panel 10 includes pixels arranged in a matrix. The reference numeral 24 denotes an active region of the 3D filter 20, which corresponds to the active region 14 of the display panel 10 and in which the first retarder pattern 20A and the second retarder pattern 20B are alternately arranged in the longitudinal direction.

Figure 6:
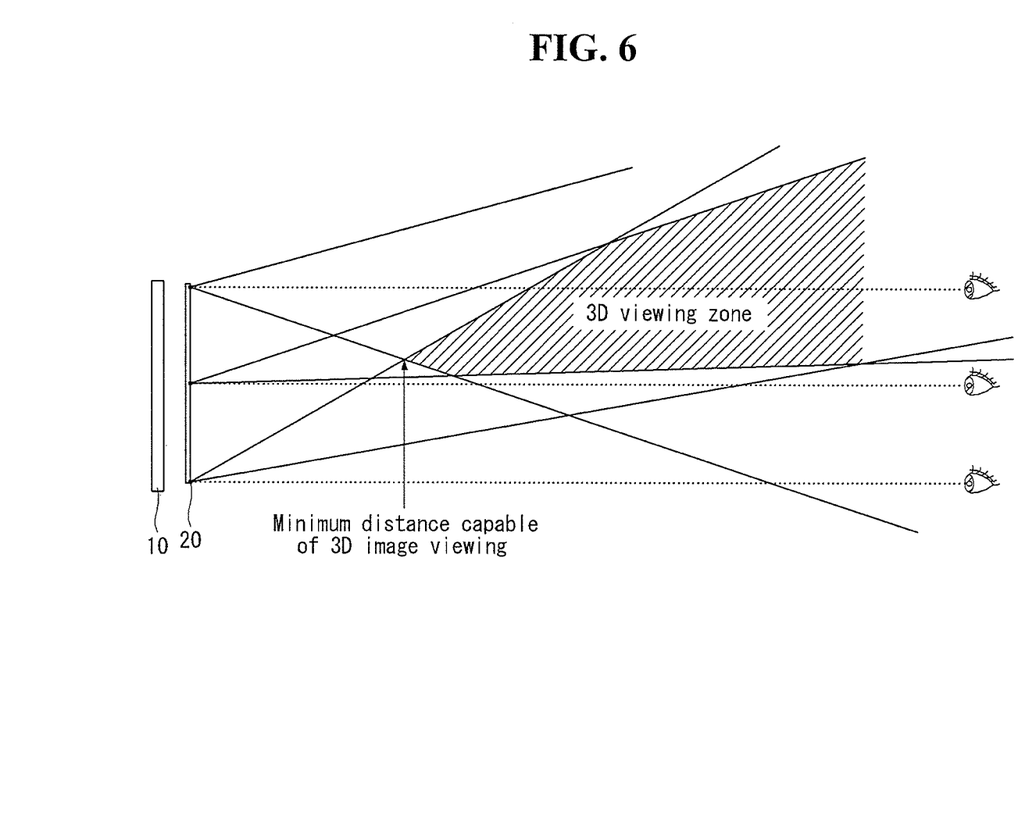
FIG. 6 is a diagram illustrating a phenomenon where up and down viewing angles are narrowed due to the accumulated alignment error as shown in FIG. 5.
Figure 7A:
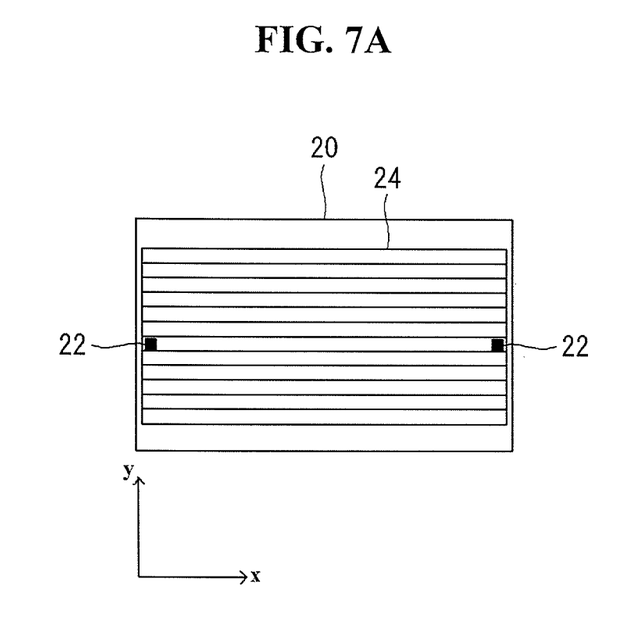
FIG. 7A is a plan view illustrating alignment marks formed at central portions of longitudinal edges of the 3D filter.
Figure 7B:
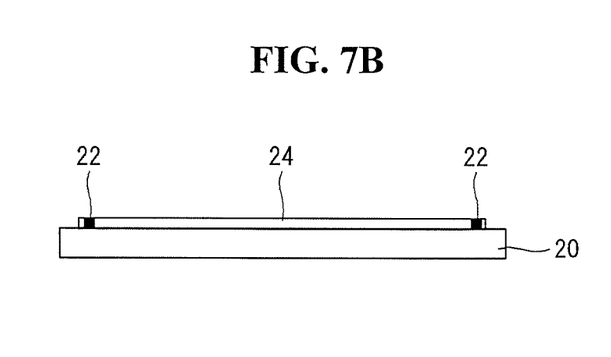
FIG. 7B is a sectional view illustrating alignment marks formed at central portions of longitudinal edges of the 3D filter.
Figure 8:
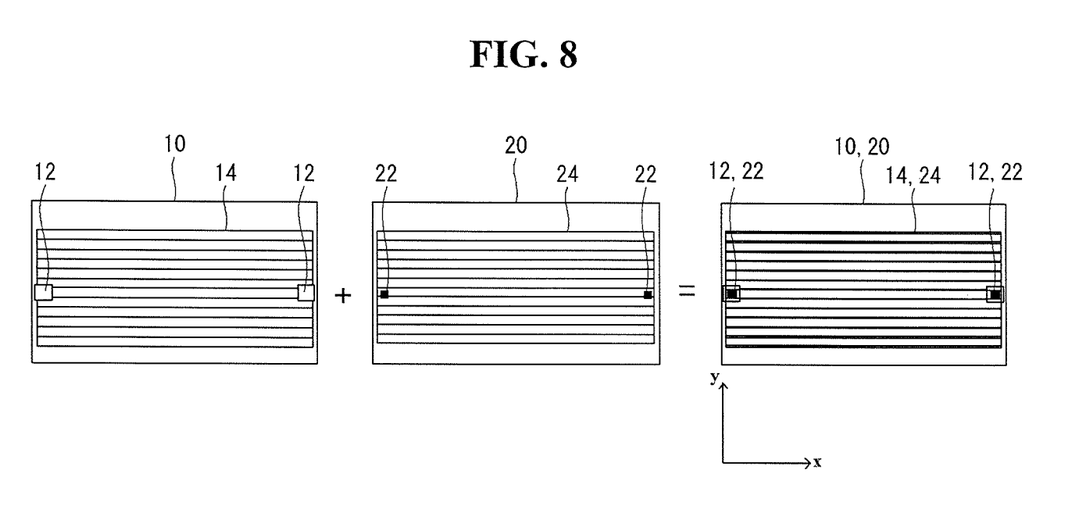
FIG. 8 is a diagram illustrating alignment marks formed at central portions of longitudinal edges of each of the display panel and the 3D filter.

When the 3D filter 20 having tolerance is aligned with the display panel 10, if they are aligned with each other with respect to the alignment marks 12 and 22 formed at the upper end (or lower end) of the 3D filter 20, and at the upper end (or lower end) of the display panel 10, due to accumulation of an alignment error, the alignment error increases as the distance increases from the alignment marks 12 and 22, as shown in FIG. 5. When the alignment error increases relative to the position of the alignment marks 12 and 22, the up and down viewing angles for viewing 3D images are narrowed, as shown in FIG. 6. According to a preferred embodiment, to minimize an accumulated tolerance when the 3D filter 20 is aligned with the display panel 10, as shown in FIGS. 7A to 8, the alignment marks are formed at central portions of opposite longitudinal (or lateral) edges of each of the display panel 10 and the 3D filter 20. Although the alignment marks are preferably located at the center of the corresponding longitudinal or lateral edge, the alignment marks need not be placed at the exact center or midpoint of the corresponding edges, and some variation may exist. For example, in one embodiment, the alignment marks may be located at substantially a midpoint, but may vary by about 15% of the total length of the lateral edge. For example, if the lateral edge is 50 cm in length, the exact midpoint is 25 cm from a corner, and thus the location of the alignment mark may be located at plus or minus 7.5 cm from the exact midpoint.

Figure 9:
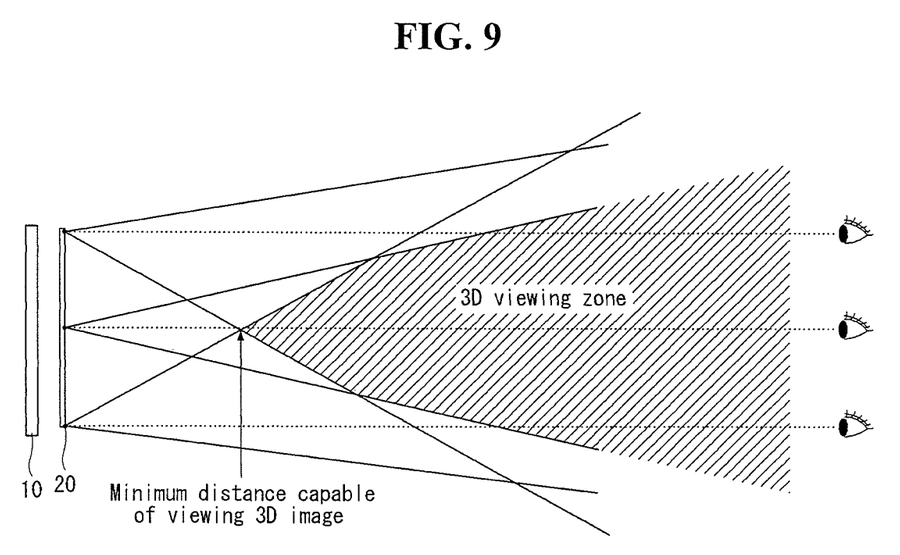
FIG. 9 is a diagram illustrating up and down viewing angle of a stereoscopic image display device where the display panel and the 3D filter are aligned with each other using the alignment marks as shown in FIGS. 7A to 8.

When the alignment marks 12 and 22 are positioned at the central portions of the longitudinal edges and the vicinity thereof of the display panel 10 and the 3D filter 20 as shown in FIGS. 7A to 8, if the alignment marks 12 and 22 overlap each other as designed to align the display panel 10 with the 3D filter 20, it is possible to minimize an accumulated value of alignment error which increases in the farther side from the alignment marks in the stereoscopic image display device. This is because the alignment error is evenly distributed upwards and downwards with respect to the alignment marks 12 and 22 as shown in FIG. 8. Therefore, when the alignment marks 12 and 22 are formed at the central portion of the longitudinal or lateral edges of each of the display panel 10 and the 3D filter 20, and the alignment marks 12 and 22 overlap each other to align the display panel 10 with the 3D filter 20, the up and down viewing angles for viewing 3D images, as shown in FIG. 9, can be widened in a horizontally symmetrical manner about a center of a display screen.

Figure 10:
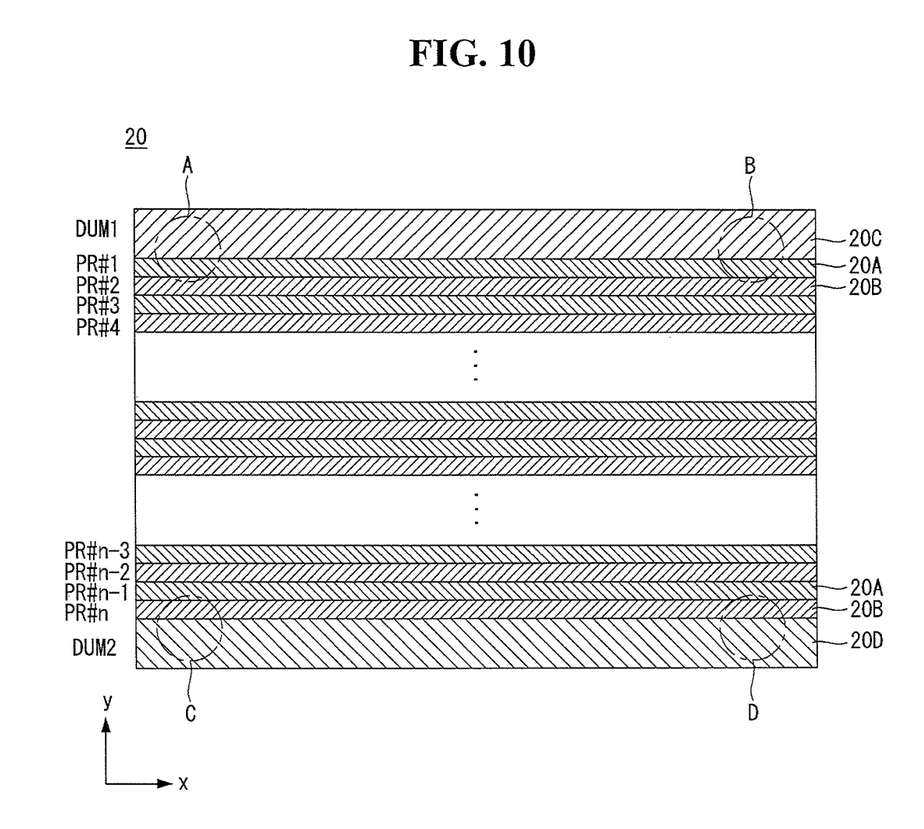
FIG. 10 is a diagram illustrating a 3D filter according to another embodiment of the invention.

FIG. 10 is a plan view illustrating another embodiment of the 3D filter 20.

Referring to FIG. 10, the 3D filter 20 comprises first retarder patterns 20A formed at the odd numbered lines PR#1, PR#3, . . . , PR#n−1, second retarder patterns 20B formed at the even numbered lines PR#2, PR#4, . . . , PR#n, a first dummy retarder pattern 20C formed on the first retarder pattern 20A positioned at the uppermost end, and a second dummy retarder pattern 20D formed under the second retarder pattern 20B positioned at the lowermost end.

The height (or width) of the first dummy retarder pattern 20C is set to be greater than that of each of the first and second retarder patterns 20A and 20B so as to be easily differentiated from the first and second retarder patterns 20A and 20B in the active region. A polarization characteristic of the first dummy retarder pattern 20C may be set to be the same as that of the second retarder pattern 20B. The height of the second dummy retarder pattern 20D is set to be greater than that of each of the first and second retarder patterns 20A and 20B so as to be easily differentiated from the first and second retarder patterns 20A and 20B in the active region. A polarization characteristic of the second dummy retarder pattern 20D may be set to be the same as that of the first retarder pattern 20A. Therefore, the first retarder patterns 20A and the second dummy retarder pattern 220D convert incident light into left circularly polarized light (or right circularly polarized light).

When the 3D filter shown in FIG. 10 is aligned with the display panel 10, the cameras 41 of the vision system capture two or more boundary regions A, B, C and D where the dummy retarder patterns 20C and 20D are seen along with the first and second retarder patterns 20A and 20B in the active region. The polarization filters 42 disposed between the cameras 41 and the 3D filter 20 may transmit specific polarization light, for example, right circularly polarized light (or left circularly polarized light).

Figure 11A:
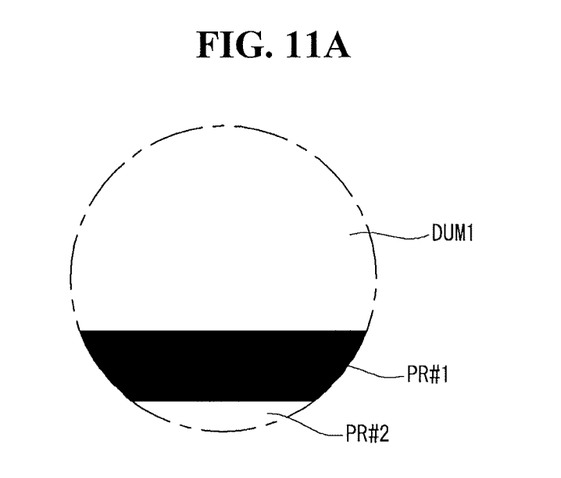
FIG. 11A is an exemplary diagram illustrating an image of the boundary regions of the 3D filter in FIG. 10, taken by cameras.
Figure 11B:
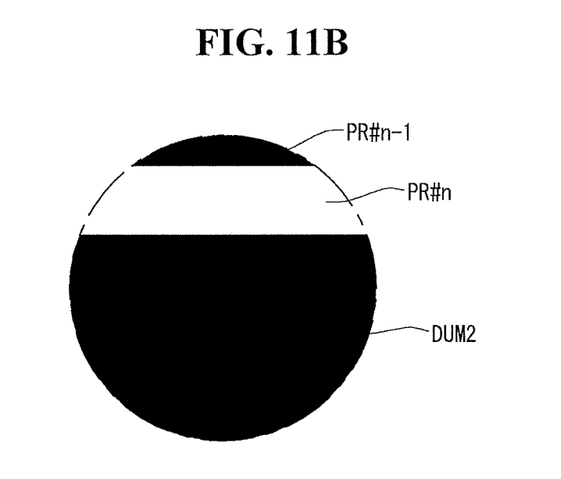
FIG. 11B is an exemplary diagram illustrating an image of the boundary region of the 3D filter in FIG. 10, taken by cameras.

If the upper cameras 41 capture the upper boundary regions A and B through the polarization filters 42, since only the right circularly polarized light or the left circularly polarized light enters the cameras 41 through the polarization filters 42, as shown in FIG. 11A, an image where the first dummy retarder pattern 20C and DUM1 and the second retarder pattern 20B and PR#2 are seen bright, whereas the first retarder pattern 20A is seen dark is obtained. In addition, if the lower cameras 41 capture the lower boundary regions C and D through the polarization filters 42, since only the right circularly polarized light or the left circularly polarized light enters the lower cameras 41 through the polarization filters 41, as shown in FIG. 11B, an image where the second dummy retarder pattern 20D and DUM1 and the first retarder pattern 20B and PR#n−1 are seen dark, whereas the second retarder pattern 20B is seen dark is obtained. Through this comparison of the images obtained by the vision system, it is possible to reduce the accumulated alignment error and also to confirm the first and second retarder patterns 20A and 20B aligned with the lines of the display panel 10 in a tilted state in the θ direction.

Figure 12A:
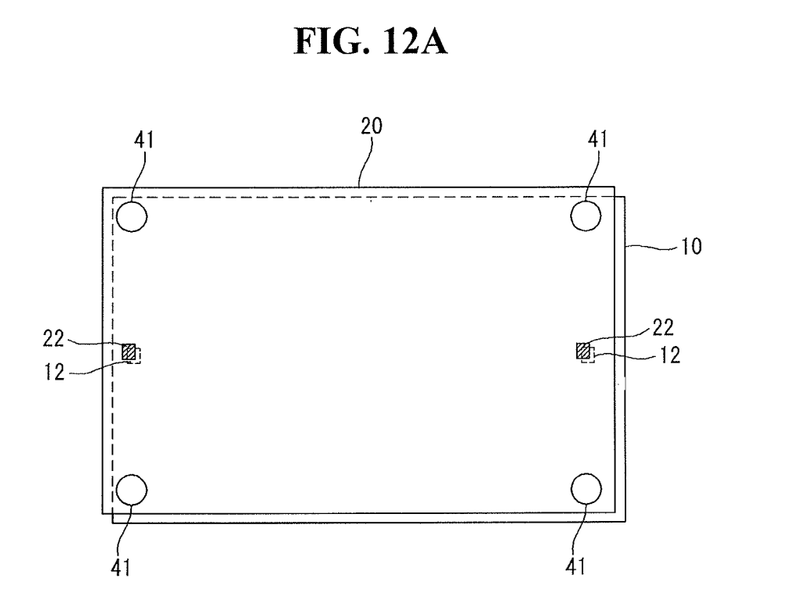
FIG. 12A is an exemplary diagram illustrating an alignment state of the display filter shown in FIG. 7A and the 3D filter shown in FIG. 10.
Figure 12B:
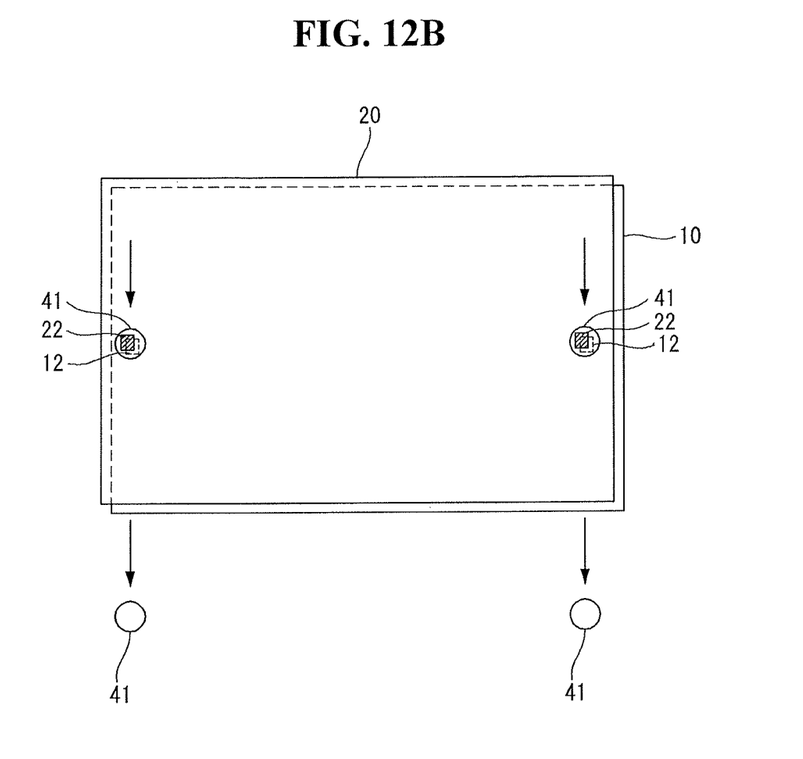
FIG. 12B is an exemplary diagram illustrating camera movement when the 3D filter is aligned on the display panel.

When the display panel 10 is aligned with the 3D filter 20, the central alignment marks 12 and 22 may be used along with the dummy retarder patterns 20C and 20D formed at the upper and lower ends of the 3D filter 20. For example, as shown in FIG. 12A, an image of the boundary regions A, B, C and D of the 3D filter is obtained using the cameras 41 and the polarization filter 42, and an alignment state of the 3D filter 20 with the display panel 10 is confirmed by analyzing the image, thereby preliminarily correcting the alignment state. Successively, as shown in FIG. 12B, an image of the central alignment marks 12 and 22 is obtained by moving the cameras 41 in the y-axis direction, and thus the alignment state can be secondarily corrected.

The display panel 10 has been described mainly based on the liquid crystal display in the above embodiment, but may be implemented using any suitable flat display panel device, such as a liquid crystal display (LCD), a field emission display (FED), a plasma display panel (PDP), an electroluminescence device (EL), an electrophoresis display (EPD), and so on.

As described above, according to this document, the alignment marks are formed at substantially the central portions of each of the 3D filter and the display panel, and the alignment marks overlap each other to align the 3D filter with the display panel, thereby distributing an accumulated tolerance upwards and downwards with respect to the alignment marks. As a result, it is possible to widen the up and down viewing angles of the stereoscopic image display device by minimizing the amount of alignment error accumulated when the 3D filter having tolerance is aligned with the display panel.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A 3D filter comprising:
   a first area having a plurality of even numbered and odd numbered alternating lines, each line having an equal height;
   the even numbered lines formed with a first polarization characteristic;
   a first dummy line formed outside of the first area and adjacent to a first line of the 3D filter, the first dummy line having a height greater than a height of a single line;
   the odd numbered lines formed with a second polarization characteristic;
   a second dummy line formed outside of the first area and adjacent to a last line of the 3D filter, the second dummy line having a height greater than the height of a single line;
   the first dummy line formed with a polarization characteristic opposite to a polarization characteristic of a first line in the first area; and
   the second dummy line formed with a polarization characteristic opposite to a polarization characteristic of a last line in the first area.

2. A stereoscopic image display device comprising:
   a display panel;
   a plurality of display alignment marks disposed along a first edge and a second edge of the display panel, respectively, the first edge being opposite to the second edge, wherein two of the plurality of display alignment marks are disposed near midpoint along opposite side edges of the display panel; and
   a 3D filter disposed in planar relation to the display panel; and
   a plurality of filter alignment marks disposed on the 3D filter, wherein an active region of the 3D filter comprises:
   a retarder pattern includes first retarder patterns and second retarder patterns,
   the first retarder patterns corresponding to odd numbered lines of the display panel and transmitting a first polarization light; and
   the second retarder patterns corresponding to even numbered lines of the display panel and transmitting a second polarization light;
   wherein the plurality of filter alignment marks comprise:
   a first dummy retarder pattern formed on an upper end of the active region and having the width greater than the width of the first retarder pattern; and
   a second dummy retarder pattern formed under a lower end of the active region and having the width greater than the width of the second retarder pattern; and
   wherein a polarization characteristic of the first dummy retarder pattern is different from a polarization characteristic of a retarder pattern positioned nearest to the first dummy retarder pattern and a polarization characteristic of the second dummy retarder pattern is different from a polarization characteristic of a retarder pattern positioned nearest to the second dummy retarder pattern.

3. The display device of claim 2
   wherein the first dummy retarder pattern has the same polarization characteristic as the second retarder pattern, and the second dummy retarder pattern has the same polarization characteristic as the first retarder pattern.

4. The display device of claim 2, wherein two of the plurality of filter alignment marks portions and two of the plurality of display alignment marks are all located on a corresponding lateral edge within a distance from an exact midpoint of the lateral edge equal to plus or minus 15% of a length of the corresponding lateral edge.

5. The display device of claim 2, wherein the display panel is a liquid crystal display, a field emission display, a plasma display, an electroluminescence display, or an electrophoresis display.

6. A stereoscopic image display alignment system, comprising:
a display panel;
a plurality of display alignment marks disposed along a first edge and a second edge of the display panel, respectively, the first edge being opposite to the second edge, wherein two of the plurality of display alignment marks are disposed near midpoint along opposite side edges of the display panel;
a 3D filter disposed in planar relation to the display panel;
a plurality of filter alignment marks disposed on the 3D filter;
a movable platform configured to support and move the panel display;
a driver adapted to control movement of the movable platform;
a plurality of sensors configured to sense misalignment between the display alignment marks and the filter alignment marks; and
a controller configured to receive signals from the sensors corresponding to an amount of sensed misalignment, and controlling the movable platform to move the display panel to minimize the misalignment,
wherein an active region of the 3D filter comprises:
a retarder pattern includes first retarder patterns and second retarder patterns,
the first retarder patterns corresponding to odd numbered lines of the display panel and transmitting a first polarization light; and
the second retarder patterns corresponding to even numbered lines of the display panel and transmitting a second polarization light;
wherein the plurality of filter alignment marks comprise:
a first dummy retarder pattern formed on an upper end of the active region and having the width greater than the width of the first retarder pattern; and
a second dummy retarder pattern formed under a lower end of the active region and having the width greater than the width of the second retarder pattern; and
wherein a polarization characteristic of the first dummy retarder pattern is different from a polarization characteristic of a retarder pattern positioned nearest to the first dummy retarder pattern and a polarization characteristic of the second dummy retarder pattern is different from a polarization characteristic of a retarder pattern positioned nearest to the second dummy retarder pattern.

7. The display device of claim 6,
wherein the first dummy retarder pattern has the same polarization characteristic as the second retarder pattern, and the second dummy retarder pattern has the same polarization characteristic as the first retarder pattern.

8. The display device of claim 6, wherein two of the plurality of filter alignment marks and two of the plurality of display alignment marks are all located on a corresponding lateral edge within a distance from an exact midpoint of the lateral edge equal to plus or minus 15% of a length of the corresponding lateral edge.

9. The system of claim 6, wherein the controller calculates a first error value between corresponding center points of the first display alignment mark and the second display alignment mark, and calculates a second error value between corresponding center points of the first 3D layer alignment mark and the second 3D layer alignment mark, based on the signals from the first and second cameras.

10. The system of claim 9, wherein the controller provides activation signals to the driver to move the display panel or the 3D layer so as to minimize the first and second error values.

11. An alignment method of a stereoscopic image display device comprising:
aligning a 3D filter with a display panel such that at least two of a plurality of display alignment marks of the display panel overlap at least two a plurality of filter alignment marks of the 3D filter;
sensing misalignment between the display alignment marks and the filter alignment marks; and
moving the display panel to minimize the misalignment based on an amount of sensed misalignment,
wherein the plurality of display alignment marks disposed along a first edge and a second edge of the display panel, respectively, the first edge being opposite to the second edge, wherein two of the plurality of display alignment marks are disposed near midpoint along opposite side edges of the display panel,
wherein an active region of the 3D filter comprises:
a retarder pattern includes first retarder patterns and second retarder patterns,
the first retarder patterns corresponding to odd numbered lines of the display panel and transmitting a first polarization light; and
the second retarder patterns corresponding to even numbered lines of the display panel and transmitting a second polarization light;
wherein the plurality of filter alignment marks comprise:
a first dummy retarder pattern formed on an upper end of the active region and having the width greater than the width of the first retarder pattern; and
a second dummy retarder pattern formed under a lower end of the active region and having the width greater than the width of the second retarder pattern; and
wherein a polarization characteristic of the first dummy retarder pattern is different from a polarization characteristic of a retarder pattern positioned nearest to the first dummy retarder pattern and a polarization characteristic of the second dummy retarder pattern is different from a polarization characteristic of a retarder pattern positioned nearest to the second dummy retarder pattern.

12. The alignment method of claim 11,
wherein the first dummy retarder pattern has the same polarization characteristic as the second retarder pattern, and the second dummy retarder pattern has the same polarization characteristic as the first retarder pattern.

13. The alignment method of claim 11, wherein two of the plurality of filter alignment marks and two of the plurality of display alignment marks are all located on a corresponding lateral edge within a distance from an exact midpoint of the lateral edge equal to plus or minus 15% of a length of the corresponding lateral edge.

* * * * *